United States Patent
Evans et al.

(10) Patent No.: US 9,068,093 B2
(45) Date of Patent: Jun. 30, 2015

(54) SURFACE MODIFICATION OF CARBON BLACK

(75) Inventors: Steven Evans, Rochester, NY (US); Ellen J. Pyszczek, LeRoy, NY (US)

(73) Assignee: Eastman Kodak Company, Rochester, NY (US)

( * ) Notice: Subject to any disclaimer, the term of this patent is extended or adjusted under 35 U.S.C. 154(b) by 166 days.

(21) Appl. No.: 13/534,293

(22) Filed: Jun. 27, 2012

(65) Prior Publication Data

US 2014/0000478 A1 Jan. 2, 2014

(51) Int. Cl.
*C09D 11/02* (2014.01)
*C09C 1/44* (2006.01)
*C09D 11/324* (2014.01)

(52) U.S. Cl.
CPC .................................. *C09D 11/324* (2013.01)

(58) Field of Classification Search
USPC .......................... 106/31.6, 472, 473, 478, 477
See application file for complete search history.

(56) References Cited

U.S. PATENT DOCUMENTS

| | | |
|---|---|---|
| 2,502,254 A | 3/1950 | Glassman |
| 2,514,236 A | 7/1950 | Glassman |
| 3,025,259 A | 3/1962 | Watson et al. |
| 3,043,708 A | 7/1962 | Watson et al. |
| 3,335,020 A | 8/1967 | Aboytes et al. |
| 5,200,164 A * | 4/1993 | Medalia et al. ............... 423/265 |
| 5,851,280 A | 12/1998 | Belmont et al. |
| 2002/0014185 A1* | 2/2002 | Lamba et al. ................. 106/476 |
| 2002/0165302 A1* | 11/2002 | Lamba et al. ................. 524/254 |
| 2008/0115695 A1 | 5/2008 | Sujeeth et al. |
| 2010/0061951 A1 | 3/2010 | Sujeeth et al. |

FOREIGN PATENT DOCUMENTS

WO 92/13983 8/1992

* cited by examiner

*Primary Examiner* — Veronica F Faison
(74) *Attorney, Agent, or Firm* — Raymond L. Owens

(57) ABSTRACT

A process for modifying the surface of a carbon black by contacting said carbon black with a conjugated diimine compound. The conjugated diimine compound may comprise various substituents to provide the carbon black with desired corresponding properties, such as groups to impart increased hydrophilicity and self-dispersibility to the carbon black. Other embodiments relate to novel carbon black products, which may be prepared according to a process of the invention. The carbon black products may be used in the same applications as conventional carbon blacks. Such uses include, but are not limited to, plastic compositions, aqueous inks, aqueous coatings, rubber compositions, paper compositions, and textile compositions. In a specific embodiment, the resulting surface modified carbon black is employed as a pigment in an aqueous inkjet ink composition.

15 Claims, No Drawings

SURFACE MODIFICATION OF CARBON BLACK

FIELD OF THE INVENTION

This invention relates to a process for the preparation of carbon black products. The process involves reacting a carbon black with a conjugated diimine compound to yield a carbon black product having a conjugated diamine group attached to the carbon black surface. The present invention further relates to use of the resulting surface modified carbon black products in an inkjet ink composition.

BACKGROUND OF THE INVENTION

Carbon black is useful in many applications. For various applications, it is desirable to use carbon black with modified properties. In particular, for use in aqueous compositions, e.g., it is desirable to use modified carbon black with ionic groups provided on the surface thereof to facilitate dispersion of the carbon black in the aqueous composition. Some processes for chemically changing the surface of carbon black are known and used commercially. For example, it is well known that a carbon black surface can be oxidized with a variety of treating agents. Surface oxidation is used to make some commercial products. Sulfonation using sulfuric acid or chlorosulfuric acid and halogenation of a carbon black surface are also known.

U.S. Pat. No. 3,043,708 describes modified carbon blacks having hydrocarbon groups chemically attached to the surface of the carbon black. The modified carbon blacks are prepared by reacting carbon black with an alkylating agent in the presence of a Friedel-Crafts type reaction catalyst. The hydrocarbon groups which reportedly can attach to the surface of the carbon black include aliphatic and aromatic groups. U.S. Pat. No. 3,025,259 describes rubber compositions containing the modified carbon blacks of U.S. Pat. No. 3,043,708.

U.S. Pat. No. 3,335,020 describes modified carbon blacks where the carbon black is treated with benzene which is then polymerized on the carbon black.

U.S. Pat. Nos. 2,502,254 and 2,514,236 describe the manufacture of pigments containing carbon black. U.S. Pat. No. 2,502,254 reports that highly dispersed pigments suitable for mass pigmentation of viscose can be obtained by generating an azo pigment in the presence of carbon black. The pigment is produced by coupling a diazotized amine and another usual intermediate for a yellow, orange, or red pigment in the presence of carbon black in one or the other of the aqueous solutions of which the mixing brings about the coupling. U.S. Pat. No. 2,514,236 reports that this process can also prepare a chocolate brown pigment by coupling one molecular proportion of a tetrazotized benzidine with two molecular proportions of an arylmethyl pyrazolone in the presence of carbon black.

PCT Patent Application No. WO 92/13983 describes a process for modifying the surfaces of carbon-containing materials by electrochemical reduction of diazonium salts. The process is reportedly applicable, in particular, to carbon plates and carbon fibers for composite materials. Carbon-containing materials modified by the process are also described.

U.S. Pat. No. 5,851,280 describes processes for preparing carbon black product having an organic group attached to the carbon black wherein a diazonium salt reacts with the carbon black in the absence of an externally applied electric current sufficient to reduce the diazonium salt, or wherein a diazonium salt reacts with the carbon black in a protic reaction medium.

U.S. Pat. App. Pub. No. 2008/0115695 describes a method of producing modified pigment by sulfonating a pigment and subsequently oxidizing the pigment, whereby the modified pigment may have sulfonic acid and carboxylic surface modifying groups attached to the surface of the pigment.

U.S. Pat. App. Pub. No. 2010/0061951 describes a method of making surface modified or self-dispersing pigment by reacting a substituted triazine compound (e.g., a tris-arylamino-1,3,5-triazine compound) with an aqueous pigment dispersion.

Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers and thermal bubble formation. In another process, known as continuous inkjet, a continuous stream of droplets is charged and deflected in an image-wise manner onto the surface of the image-recording element, while un-imaged droplets are caught and returned to an ink sump. Inkjet printers have found broad applications across markets ranging from desktop document and photographic-quality imaging, to short run printing and industrial labeling.

Pigment-based inkjet inks are often preferred over dye-based inkjet inks because of the superior image stability typically observed with the pigment-based inks. Self-dispersed pigments in turn are often preferred over surfactant-dispersed, oligomer-dispersed or polymer-dispersed pigments because of their greater stability to a variety of ink formulations and environmental keeping conditions. Self-dispersed pigments are typically used when high density and sharp images are required such as for the printing of text and graphics, and are especially useful when printing on plain papers (i.e., papers not specifically designed to render photographic quality images).

Despite the technologies discussed above, there remains a desire for additional methods for modifying the surface chemistry of carbon black to impart desired properties to the carbon black. In particular, there remains a desire for additional methods for modifying the surface chemistry of carbon black to impart increased hydrophilicity and self-water dispersibility to carbon black pigments for use in aqueous inks.

SUMMARY OF THE INVENTION

In accordance with a first embodiment, the invention is directed towards a process for modifying the surface of a carbon black comprising contacting said carbon black with a conjugated diimine compound. In specific embodiments, the conjugated diimine compound may comprise various substituents to provide the carbon black with desired corresponding properties, such as carboxylic or sulfonic acid groups to impart increased hydrophilicity and self-dispersibility to the carbon black. Other embodiments of the invention relate to novel carbon black products, which may be prepared according to a process of the invention. The carbon black products may be used in the same applications as conventional carbon blacks. Such uses include, but are not limited to, plastic compositions, aqueous inks, aqueous coatings, rubber compositions, paper compositions, and textile compositions. In a further specific embodiment, the resulting surface modified carbon black is employed as a pigment in an aqueous inkjet ink composition.

DETAILED DESCRIPTION OF THE INVENTION

A first embodiment of the invention is directed towards a process for modifying the surface of a carbon black, wherein carbon black pigment is contacted with a conjugated diimine compound, i.e. a compound containing two imine groups linked through a conjugated atom chain. The conjugated diimine compound may be obtained, e.g., by oxidizing a corresponding conjugated diamine compound. In a particular embodiment, conjugated diimine compounds employed in the present invention may conveniently be formed in situ by oxidation of a conjugated diamine compound in the presence of the carbon black in an aqueous reaction medium. Such oxidation chemistry is well known in photographic color development processes, wherein conjugated diamine compounds are conventionally employed as photographic color developers, which upon oxidation to conjugated diimine compounds react with color image dye forming couplers. Conjugated diamine compound useful in the present invention include, e.g., known photographic color developer compounds, such as p-phenylenediamine, aminohydroxy pyrazole, and aminopyrazoline compounds.

While in a color development process oxidized color developer compounds in the form of conjugated diimines are reacted with photographic imaging couplers to form image dyes, the present invention instead reacts conjugated diimine compounds with carbon black surface groups, so as to form resulting conjugated diamine compounds attached to the carbon black surface. Carbon blacks typically have chemisorbed oxygen complexes (e.g., carboxylic, quinonic, lactonic, or phenolic groups) on their surfaces to varying degrees depending on the carbon black manufacturing process and any prior surface treatment conditions and mechanisms. Most carbon blacks are thus inherently electron rich, and prone to electrophilic substitution reactions. The conjugated diimine compounds employed in the invention are generally considered to be electrophiles and prone to reaction at one of the terminal nitrogen atoms with suitable nucleophiles such as photographic color imaging dye forming couplers or, as in the case of this invention, with a carbon black surface. Certain oxygenated functional groups such as phenols, ketones and the like that are present in varying degrees on the carbon black surface due to the manufacturing process can enhance this reactivity with the conjugated diimine. In specific embodiments, the conjugated diimine compound may comprise various substituents to provide the resulting modified carbon black with desired corresponding properties, such as carboxylic or sulfonic acid groups to impart increased hydrophilicity and self-dispersibility to the carbon black. Other desired properties may be provided by selection of other corresponding substituents.

Although photographic color developer compounds are typically oxidized by silver halide in photographic color development processes, any suitable oxidizing agent may be employed in the present invention to obtain a conjugated diimine compound from a conjugated diamine compound. In specific embodiments, a p-phenylenediamine, aminohydroxy pyrazole or aminopyrazoline compound may be oxidized with, e.g., an oxidant which comprises an alkali- or alkaline earth-hypochlorite, -persulfate, -ferricyanide, -percarbonate, -perborate, -peroxymonosulfate or -permanganate; hydrogen peroxide or a salt thereof; or an aliphatic or aromatic organic peracid or a salt thereof.

In a specific embodiment, a p-phenylenediamine compound is employed, such that the conjugated diimine compound is obtained by oxidizing the p-phenylenediamine to form a quinonediimine compound. Such quinonediimine formation reaction is described, e.g., in "The Theory of the Photographic Process," 4$^{th}$ Edition, edited by T. H. James, Macmillan Publishing, New York, 1977, (see, e.g., Chapter 12, Principles and Chemistry of Color Photography), and is representative of the reaction formation chemistry for formation of a conjugated diimine from these and other types of conjugated diamines useful in the present invention. Specific p-phenylenediamine compounds useful in the present invention, e.g., include those represented by the following structure:

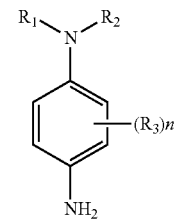

wherein $R_1$ may be H, substituted or unsubstituted alkyl, substituted or unsubstituted aryl, substituted or unsubstituted cycloalkyl, hetaryl or polyoxyalkylene; $R_2$ may be substituted or unsubstituted alkyl, substituted or unsubstituted aryl, substituted or unsubstituted cycloalkyl, hetaryl or polyoxyalkylene; each of $R_3$ may independently be H, halogen, alkoxy, aryloxy, alkyl, aryl, hetaryl, hydroxyl, amino, alkyl- or dialkyl-amino, aryl- or diaryl-amino, arylalkylamino, alkylamido, arylamido, carbamoyl, alkylcarbamoyl, arylcarbamoyl, N,N-dialkylcarbamoyl, N,N-diarylcarbamoyl, N-alkyl, N-arylcarbamoyl, carboxy, sulfa, phospho, alkylsulfonamido, arylsulfonamido, alkoxycarbonyl, arylcarbonyl, acyl, ureido, alkyl- or aryl-ureido, thioalkyl, cyano or nitro; n represents an integer from 1 to 4; $R_1$ and $R_2$ or two adjacent $R_3$ may be combined together to form a 5- to 7-membered carbo- or heterocyclic ring; and one of $R_3$ may be combined together with $R_1$ or $R_2$ to form a 5- to 7-membered carbo- or heterocyclic ring. Preferably, $R_1$ may be H, substituted or unsubstituted alkyl of 1-6 carbons, substituted or unsubstituted aryl of 6-10 carbons, substituted or unsubstituted cycloalkyl of 3-6 carbons, hetaryl or polyoxyalkylene; and $R_2$ may be substituted or unsubstituted alkyl of 1-6 carbons, substituted or unsubstituted aryl of 6-10 carbons, substituted or unsubstituted cycloalkyl of 3-6 carbons, hetaryl or polyoxyalkylene. To impart increased hydrophilicity and self-dispersibility to the carbon black, at least one of $R_1$, $R_2$, or $R_3$ comprises an acid group, such as a carboxylic or sulfonic acid substituted group.

Specific examples of conjugated diamines useful in the present invention include the following conjugated diamines CD-1 to CD-17:

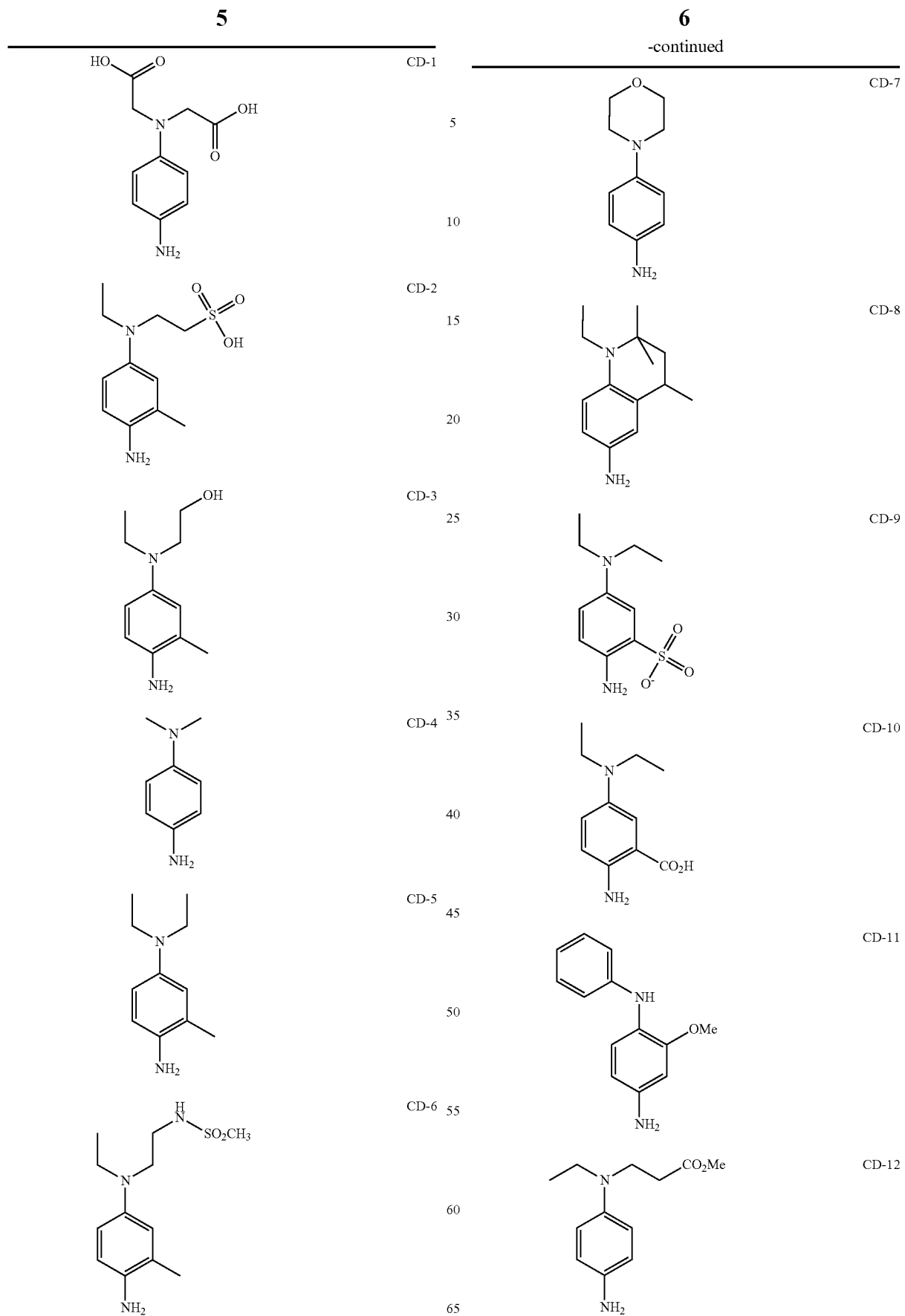

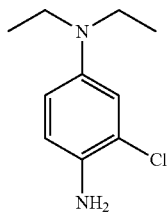
CD-13

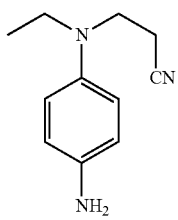
CD-14

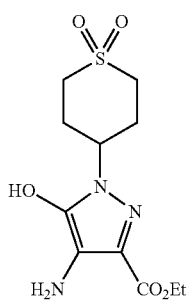 [SMILES: CCOC(=O)c1nn(C2CCS(=O)(=O)CC2)c(O)c1N]
CD-15

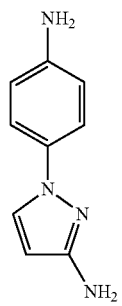
CD-16

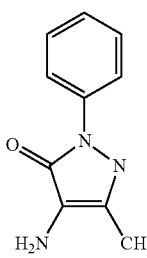
CD-17

Any carbon black may be used in the processes of this invention. The resulting carbon black products are useful in applications known for conventional carbon blacks. The properties of the carbon blacks are selected based upon the intended application. More importantly, the processes of this invention can be used to provide carbon black products having advantageous properties not associated with conventional carbon blacks.

The following representative carbon black pigments are among those useful as substrates suitable for chemical modification in the practice of the invention; however, this listing is not intended to limit the invention. The following representative carbon black pigments are available from Cabot: MONARCH 1400, MONARCH 1300, MONARCH 1100, MONARCH 1000, MONARCH 900, MONARCH 880, MONARCH 800, and MONARCH 700. The following representative carbon black pigments are available from Columbian: RAVEN 7000, RAVEN 5750, RAVEN 5250, RAVEN 5000, and RAVEN 3500. The following representative carbon black pigments are available from Orion Engineered Carbon: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, PRINTEX U, PRINTEX V, PRINTEX 140U, PRINTEX 140V, NIPex-160, NIPEx-170, and NIPex-180. The following representative carbon black pigment is available from Sun Chemical: LHD9303 Black.

The processes of the invention can be carried out under a wide variety of conditions and in general are not limited by any particular condition. The reaction conditions need only be such that the conjugated diimine is sufficiently stable to allow it to react with the carbon black. Thus, the processes can be carried out under reaction conditions where the conjugated diimine is short lived, and in particular wherein the conjugated diimine is prepared in situ during the oxidation of a corresponding conjugated diamine in the presence of the carbon black. The processes of this invention are preferably carried out in an aqueous reaction medium, that is, in water alone or a mixture of water and other solvents. If desired, the resulting modified carbon black product can be isolated and dried by means known in the art. Furthermore, the resultant carbon black product can be treated to remove impurities by known techniques. Various preferred embodiments of these processes are shown in the examples.

According to the processes of the invention, the reaction between a conjugated diimine and a carbon black can take place with any type of carbon black, for example, in powdered, fluffy or pelleted form. The carbon black pigment and conjugated diimine (or conjugated diamine and oxidizing agent) may be simply dispersed or stirred in a suitable amount of water. For example, a ball mill, an attritor, a colloid mill, or a sand mill with glass, zirconia, alumina, stainless steel, magnetic or other beads added thereto may be used for stirring. In this case, preferably, the pigment may be previously ground to a desired particle size. Alternatively, the pigment may be reacted with the surface modifier while grinding the pigment. The grinding may be carried out by means of a rotary homogenizer or an ultrasonic homogenizer. Beads and coarse particles are separated from the dispersion after stirring and surface modification, followed by the removal of by-products to perform purification. Thus, an aqueous pigment dispersion is obtained. If necessary, for example, concentration by a separation membrane or the like, filtration through a metallic filter or a membrane filter, classification by centrifugation, or neutralization with a hydroxide of an alkali metal salt or an amine may be carried out.

The reaction between a conjugated diimine compound and a carbon black according to a process of this invention forms a carbon black product having a conjugated diamine group attached to the carbon black. Thus, the present invention further relates to carbon black products having conjugated diamine organic groups attached to the carbon black, particularly those prepared by a process of this invention. The conjugated diamine group may have various substituent groups as noted above. An advantage of the carbon black products having an attached conjugated diamine group substituted with an acid substituted group, e.g., a carboxylic or sulfonic acid substituted group, is that the carbon black product may have increased water dispersibility relative to the corresponding untreated carbon black. When such a water dispersible carbon black product is prepared by a process of the invention, the resulting product solution or slurry may be used as is or diluted prior to use. Alternatively, the carbon black product may be dried by techniques used for conventional carbon blacks. These techniques include, but are not limited to, drying in ovens and rotary kilns.

The carbon black products of this invention may be used in the same applications as conventional carbon blacks. The conjugated diamine groups attached to the carbon black, however, can be used to modify and improve the properties of a given carbon black for a particular use. If desired these groups attached to the carbon black may also be chemically changed using means known in the art into other groups for a particular use. For example, an acid group can be converted to its salt or its amide.

Possible end use applications for carbon black products according to the invention include, for example, plastic compositions, aqueous inks, aqueous coatings, rubber compositions, paper compositions and textile compositions. In a preferred embodiment, the carbon black products of this invention are particularly useful in aqueous ink formulations. The water-dispersible carbon black products discussed above are particularly preferred for this use. Thus, the invention provides an improved ink composition comprising water and a carbon black, the improvement comprising the use of a carbon black product according to the invention. Other known aqueous ink additives may be incorporated into the aqueous ink formulation. The carbon black products of the invention, either as predispersion or as a solid, can be incorporated into an aqueous ink formulation using standard techniques. Use of a water dispersible carbon black product of the invention provides a significant advantage and cost savings by reducing or eliminating the milling steps generally used with other conventional carbon blacks.

Surface modified, and in a particular embodiment self-dispersing, carbon black pigments prepared in accordance with the present invention preferably have a median equivalent spherical particle diameter from 55 nm to 200 nm, preferably 55 to 170 nm and more preferably 55 to 150 nm. As used herein, median particle diameter refers to the 50th percentile such that 50% of the volume of the particles is composed of particles having diameters smaller than the indicated diameter. It is understood the pigment dispersion of the invention are composed of aggregates of primary carbon black smaller than the mean particle diameter from above. Typical primary particle sizes of the carbon black particles comprising the pigment dispersion may be in the range of 10 nm to 30 nm. The median particle diameter in the present invention is measured by using a Microtrac Ultrafine Particle Analyzer (UPA) 150 from Microtrac, Inc.

The inkjet inks of one embodiment of the present invention may desirably comprise self-dispersing carbon black pigment at a weight concentration of from 1 to 10 wt %, more preferably 3 to 10 wt %. The ink preferably has physical properties compatible with a wide range of ejecting conditions, i.e., driving voltages and pulse widths for thermal inkjet printing devices, driving frequencies of the piezo element for either a drop-on-demand device or a continuous device, and the shape and size of the nozzle. The exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Acceptable viscosities are typically no greater than 20 cP, and preferably in the range of 1.0 to 6.0 cP and most preferably in the range of 1.5 and 3 cP. The inkjet inks useful in the invention typically exhibit a solution density of between 1 and 1.2 g/cc.

Additional additives which may optionally be present in an inkjet ink composition include jetting aids, thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers. A biocide (0.01-1.0% by weight) may also be added to prevent unwanted microbial growth which may occur in the ink over time.

The pH of the aqueous ink compositions of the invention may be adjusted by the addition of acids or bases. Useful inks may have a preferred pH of from 4 to 10, depending upon the type of pigment being used. Preferably, the pH of the present ink is from 5 to 9, more preferably from 7 to 9. Typical inorganic acids include hydrochloric, phosphoric, and sulfuric acids. Typical organic acids include methanesulfonic, acetic, and lactic acids. Typical inorganic bases include alkali metal hydroxides and carbonates. In a particular embodiment, an organic base may be employed to reduce polymer deposits on components of the printing system during periods of latency as disclosed in US 2010/0092669, the disclosure of which is incorporated by reference herein. Typical organic bases include ammonia, tetramethylethlenediamine, and triethanolamine. Particularly useful organic bases include those having pKa's in the range of between 7 and 9. Preferred organic bases include those selected from imidazole, N,N-Bis(2-hydroxyethyl)taurine, 4-Morpholinepropanesulfonic acid, triethanolamine, tris(hydroxymethyl)aminomethane, tricine, and diglycine.

Ink compositions useful in the invention may include humectants and/or co-solvents in order to prevent the ink composition from drying out or crusting in the nozzles of the printhead, aid solubility of the components in the ink composition, or facilitate penetration of the ink composition into the image-recording element after printing. Representative examples of humectants and co-solvents used in aqueous-based ink compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, Methylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane dial, glycerol, 1,2,6-hexanetriol, 2-ethyl-2-hydroxymethyl-propane diol, saccharides and sugar alcohols and thioglycol; (3) lower mono- and di-alkyl ethers derived from the polyhydric alcohols such as, ethylene glycol monomethyl ether, ethylene glycol monobutyl ether, ethylene glycol monoethyl ether acetate, diethylene glycol monomethyl ether, diethylene glycol monobutyl ether, polyethylene glycol monobutyl ether, and diethylene glycol monobutyl ether acetate; (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone. Typical aqueous-based ink compositions useful in the invention may contain, for example, the following components based on the total weight of the ink: water 20-95%, humectant(s) 5-70%, and co-solvent(s) 2-20%.

Inkjet printing systems useful in the invention comprise a printer, at least one ink composition in accordance with the invention, and an image recording element, typically a sheet (herein also "media"), suitable for receiving ink from an inkjet printer. In one embodiment, the invention is directed towards an inkjet printing method comprising the steps of: a) providing an inkjet printer that is responsive to digital data signals; b) loading the printer with an inkjet recording element; c) loading the printer with an aqueous inkjet ink composition of the invention; and d) applying the inkjet ink composition to the inkjet recording element in response to digital data signals. Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers and thermal bubble formation. Drop-on-demand (DOD) liquid emission devices have been known as ink printing devices in inkjet printing systems for many years. Early devices were based on piezoelectric actuators such as are disclosed in U.S. Pat. Nos. 3,946,398 and 3,747,120. A currently popular form of inkjet printing, thermal inkjet (or "thermal bubble jet"), uses electrically resistive heaters to generate vapor bubbles which cause drop emission, as is discussed in U.S. Pat. No. 4,296,421. In another process, known as continuous inkjet, a continuous stream of droplets is charged and deflected in an image-wise manner onto the surface of the image-recording element, while un-imaged droplets are caught and returned to an ink sump. Continuous inkjet printers are disclosed, e.g., in U.S. Pat. Nos. 6,588,888; 6,554,410; 6,682,182; 6,793,328; 6,866,370; 6,575,566; and 6,517,197. Inkjet printers have found broad applications across markets ranging from desktop document and photographic-quality imaging, to short run printing and industrial labeling. Inkjet printing methods, and related printers, are commercially available and need not be described in detail.

The inks of the invention are preferably utilized in an inkjet set comprising at least magenta, cyan, yellow, and black inks. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632. Colorless inks are also used to provide an overcoat to a printed image, usually in order to improve scratch resistance and waterfastness; see for example, US Publication No. 2002/0009547 or EP Publication No. 1,022, 151 A1.

The present invention can be employed with a wide variety of recording media, including plain papers such as XEROX 4024 papers, including Ashdown 4024 DP, Cortland 4024 DP, Champion 4024 DP, XEROX 4024 D.P. green, XEROX 4024 D.P. pink, XEROX 4024 D.P yellow, and the like, XEROX 4200 papers, XEROX 10 series paper, XEROX Imaging Series LX paper, canary ruled paper, ruled notebook paper, bond paper such as Gilbert 25 percent cotton bond paper, Gilbert 100 percent cotton bond paper, and Strathmore bond paper, recycled papers, silica coated papers such as Sharp Company silica coated paper, JUJO paper, Georgia-Pacific inkjet Paper Catalog Number 214305N, KODAK bright white inkjet paper, HEWLETT PACKARD Color inkjet paper, XEROX Extra Bright white inkjet paper, Georgia-Pacific inkjet Paper Catalog Number 999013, STAPLES inkjet paper, International Paper Great White MultiUse 20 Paper, 8) XEROX Premium Multipurpose Paper, HAMMERMILL Copy plus or ForeMP paper, and HEWLETT PACKARD Multipurpose paper, glossy papers, and the like, transparency materials such as XEROX 3R3351 inkjet transparencies, TETRONIX inkjet transparencies, ARKRIGHT inkjet transparencies, HEWLETT-PACKARD inkjet transparencies, and the like, fabrics, textile products, plastics, polymeric films, inorganic substrates such as metals and wood, and the like.

The following examples illustrate, but do not limit, the utility of the present invention.

Characterization of Surface Modified Carbon Black Pigments by Pyrolysis/Gas Chromatography/Mass Spectrometry (PY/GC/MS).

A sample (1-2 mg) of solid modified carbon black pigment was placed in a quartz pyrolysis tube and subjected to thermal desorption at 350° C. for 60" followed by pyrolysis at 800° C. for 20". The volatiles from each heating step were swept by a flow of Helium onto a GC column (RTX-5HT 30 meter×0.32 mm ID×0.25 um film thickness), and trapped with liquid nitrogen at −100° C. in the GC column. The column was heated in a controlled manner (28° C. hold 4 minutes, ramped to 360° C. at 10° C. per min, then hold for 3 min. at 360° C.). The eluting vapor stream was analyzed with an HP 5973N GC/MS detector with a scan range of 10-800 m/z. The observed pyrolysis products correlate to the surface bonded groups introduced during the treatment process.

Example 1

Preparation of a Surface Modified Carbon Black Pigment Dispersion SMCB-1

Carbon black pigment (FW200 obtained from Orion Engineered Carbon, 5.0 g) was suspended in 200 mL of distilled water with stirring by a saw-tooth Cowles-type blade at 500 rpm. To this suspension was added 10% aqueous sodium hydroxide (NaOH) solution to raise the pH from 2.47 to ~7-7.5. Meanwhile, conjugated diamine CD-1 (2.24 g, 0.01 m) was dissolved in ~50 mL water containing 0.5 g NaOH and added to the above carbon black suspension. Additional 10% NaOH was added to bring the pH back to ~7. To the resulting suspension was then added, in portions, 5.4 g (0.02 m) of potassium persulfate dissolved/suspended in 100 mL of water. Additional 10% NaOH was added during the addition to maintain a pH of ~7. The suspension was stirred at room temperature overnight. The crude dispersion was transferred to a dialysis bag with a 12-14 k MWCO rating and dialyzed overnight to remove the bulk of the salts and reaction by-products.

The dilute crude dispersion was passed through a Microfluidics microfluidizer with 100 uM interaction chamber at 6000 psi. The dispersion was then concentrated by tangential flow filtration (TFF) using a Spectrum Labs KrosFlo apparatus fitted with a 145 cm$^2$ polysulfone filter module with effective pore size of 0.05 uM. After sonication for 30", the final dispersion weighed 49.5 g, had a conductivity of 279 uS/cm$^2$ and a pH of 8.8. The % solids as measured by evaporation of a portion of the dispersion was 9.34%, corresponding to a mass recovery of 92.4%. The particle size was measured by MicroTrac UPA. The volume weighted median ($50^{th}$ percentile) equivalent spherical diameter of the particle size distribution was 118 nm.

PY/GC/MS analysis of the solids from SMCB-1 showed the presence of several fragments containing two nitrogens (diaminobenzene, cyanoaniline, acridineamine) during the 800° C. heat. This is consistent with pyrolysis of a bis(carboxymethylamino)phenylamino-modified carbon surface.

Example 2

Preparation of Surface Modified Carbon Black Pigment Dispersion SMCB-2

The procedure of Example 1 was repeated except that Orion Nipex160IQ carbon black was used in place of FW200. The resulting dispersion was 9.06% solids with pH of 7.48, conductivity 192 uS/cm² and volume weighted median particle size of 142 nm.

Example 3

Preparation of Surface Modified Carbon Black Pigment Dispersion SMCB-3

The procedure of Example 1 was repeated except that Orion Nipex180IQ carbon black was used in place of FW200. The resulting dispersion was 9.05% solids with pH of 7.07, conductivity 192 uS/cm² and volume weighted median particle size of 127 nm.

Example 4

Preparation of Surface Modified Carbon Black Pigment Dispersion SMCB-4

The procedure of Example 1 was repeated except that Orion Printex80 carbon black was used in place of FW200. The resulting dispersion was 8.6% solids with pH of 6.78, conductivity 112 uS/cm² and volume weighted median particle size of 134 nm.

Example 5

Preparation of Surface Modified Carbon Black Pigment Dispersion SMCB-5

The procedure of Example 1 was repeated except that Orion Nipex180IQ carbon black was used in place of FW200 and conjugated diamine CD-2 was used in place of CD-1. The resulting dispersion was 9.46% solids with pH of 7.03, conductivity 237 uS/cm² and volume weighted median particle size of 136 nm.

Preparation and Inkjet Printing of an Ink Containing a Surface Modified Carbon Black Pigment.

An ink (Ink-1) was prepared by mixing 9.64 g of dispersion SMCB-1, 2 g glycerol, 0.4 g ethylene glycol, 0.32 g benzylmethacrylate-methacrylic acid (77.5:22.5) co-polymer and 0.15 g Tergitol® 15-s-5 surfactant (available from Dow Chemical) with sufficient water to give a total weight of 20 g. The resulting ink containing 4.5% modified carbon black pigment was loaded into an empty Kodak EasyShare® 5300-compatible black ink cartridge and printed onto Kodak Ultimate® inkjet paper with a Kodak EasyShare® 5300 printer. The maximum visual print density (D-max) was measured using a Spectrolino reflection spectrophotometer and the results are shown in Table 1. Similarly inks Ink-2 to Ink-5 from dispersions SMCB-2 to SMCB-5 were prepared and printed as above and the results are also tabulated in Table 1.

A control ink (Control-1) with similar formulation was prepared from a commercially-available oxidized self-dispersing carbon black dispersion (BonJet CW-3 available from Orient Chemical Corporation) and printed as above and the results tabulated in Table 1.

TABLE 1

| Ink # | Dispersion | D-max Print Density on Kodak Ultimate Paper |
|---|---|---|
| Ink-1 | SMCB-1 | 1.48 |
| Ink-2 | SMCB-2 | 1.52 |
| Ink-3 | SMCB-3 | 1.5 |
| Ink-4 | SMCB-4 | 1.38 |
| Ink-5 | SMCB-5 | 1.5 |
| Control-1 | BonJet CW-3 (Orient Chemical Corporation) | 1.46 |

The results in Table 1 show that dispersions of surface modified carbon black pigments prepared by the process of the invention yield inkjet inks that yield comparable print densities to commercially available dispersions.

Example 6

Preparation of a Surface-Modified Carbon Black Pigment SMCB-6

Carbon black pigment (Nipex 180IQ obtained from Orion Engineered Carbon, 5.0 g) was suspended in 200 mL of 1:1 methanol:distilled water with stirring by a saw-tooth Cowles-type blade at 500 rpm. To this suspension was added 10% aqueous sodium hydroxide (NaOH) solution to raise the pH from 2.47 to ~6.5. Meanwhile, conjugated diamine CD-3 (2.92 g, 0.01 m) was dissolved in ~15 mL of 1:1 methanol:water and added to the above carbon black suspension. Additional 10% NaOH was added to bring the pH back to ~7.5. To the resulting suspension was then added, in portions over 15 minutes, 5.4 g (0.02 m) of solid potassium persulfate. Additional 10% NaOH was added during the addition to maintain a pH of ~7. The suspension was stirred at room temperature for 2 hr. The modified carbon black was collected on a fine fitted glass funnel, rinsed with water, methanol and water again and dried at 60° C./20 mm Hg vacuum. The yield was 5.3 g, corresponding to a mass recovery of 106%. PY/GC/MS analysis showed fragments consistent with pyrolysis of an N-ethyl-N-hydroxyethyl-3-methylanilino-modified carbon surface (m-toluidine, 2-methylbenzenediamine, etc.). In addition, non-aqueous titrimetry indicated 0.163 meq/g weak base.

The invention has been described with reference to a preferred embodiment however it will be appreciated that variations and modifications can be effected by a person of ordinary skill in the art without departing from the scope of the invention.

The invention claimed is:

1. A process for modifying the surface of a carbon black comprising contacting said carbon black with a conjugated diimine compound, wherein the conjugated diimine compound is obtained by oxidizing a p-phenylenediamine to form a quinonediimine compound with an oxidant which comprises an alkali- or alkaline earth-hypochlorite, -persulfate, -ferricyanide, -percarbonate, -perborate, -peroxymonosulfate or -permanganate; hydrogen peroxide or a salt thereof; or an aliphatic or aromatic organic peracid or a salt thereof and wherein the p-phenylenediamine is represented by the following structure:

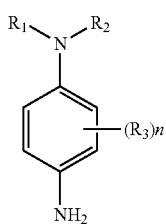

wherein $R_1$ may be H, substituted or unsubstituted alkyl, substituted or unsubstituted aryl, substituted or unsubstituted cycloalkyl, hetaryl or polyoxyalkylene; $R_2$ may be substituted or unsubstituted alkyl, substituted or unsubstituted aryl, substituted or unsubstituted cycloalkyl, hetaryl or polyoxyalkylene; each of $R_3$ may independently be H, halogen, alkoxy, aryloxy, alkyl, aryl, hetaryl, hydroxyl, amino, alkyl- or dialkyl-amino, aryl- or diaryl-amino, arylalkylamino, alkylamido, arylamido, carbamoyl, alkylcarbamoyl, arylcarbamoyl, N,N-dialkylcarbamoyl, N,N-diarylcarbamoyl, N-alkyl, N-arylcarbamoyl, carboxy, sulfo, phospho, alkylsulfonamido, arylsulfonamido, alkoxycarbonyl, arylcarbonyl, acyl, ureido, alkyl- or aryl-ureido, thioalkyl, cyano or nitro;

n represents an integer from 1 to 4;

$R_1$ and $R_2$ or two adjacent $R_3$ may be combined together to form a 5- to 7-membered carbo- or heterocyclic ring; and one of $R_3$ may be combined together with $R_1$ or $R_2$ to form a 5- to 7-membered carbo- or heterocyclic ring.

2. The process of claim 1 wherein $R_1$ may be H, substituted or unsubstituted alkyl of 1-6 carbons, substituted or unsubstituted aryl of 6-10 carbons, substituted or unsubstituted cycloalkyl of 3-6 carbons, hetaryl or polyoxyalkylene; $R_2$ may be substituted or unsubstituted alkyl of 1-6 carbons, substituted or unsubstituted aryl of 6-10 carbons, substituted or unsubstituted cycloalkyl of 3-6 carbons, hetaryl or polyoxyalkylene; $R_1$ and $R_2$ or two adjacent $R_3$ may be combined together to form a 5- to 7-membered carbo- or heterocyclic ring; and one of $R_3$ may be combined together with $R_1$ or $R_2$ to form a 5- to 7-membered carbo- or heterocyclic ring.

3. The process of claim 1 wherein at least one of $R_1$, $R_2$, or $R_3$ comprises a carboxylic or sulfonic acid substituted group.

4. The process of claim 1 wherein the conjugated diimine compound is obtained by oxidizing a p-phenylenediamine, an aminohydroxy pyrazole or an aminopyrazoline compound with an oxidant which comprises an alkali- or alkaline earth-hypochlorite, -persulfate, -ferricyanide, -percarbonate, -perborate, -peroxymonosulfate or -permanganate; hydrogen peroxide or a salt thereof; or an aliphatic or aromatic organic peracid or a salt thereof.

5. The process of claim 1 wherein the conjugated diimine compound is obtained by oxidizing a p-phenylenediamine, an aminohydroxy pyrazole or an aminopyrazoline compound having at least one carboxylic or sulfonic acid substituted group.

6. The process of claim 1, comprising contacting said carbon black with a quinonediimine compound.

7. The process of claim 1, wherein the carbon black comprises carbon black particles having a volume weighted median equivalent spherical particle diameter of from 55 nm to 200 nm.

8. A surface modified carbon black product obtained by the process of claim 1, comprising carbon black particles having conjugated diamine groups attached to the carbon black particle surfaces.

9. The carbon black product of claim 8, wherein the conjugated diamine groups comprise a carboxylic or sulfonic acid substituted group.

10. The carbon black product of claim 8, wherein the carbon black particles have a volume weighted median equivalent spherical particle diameter of from 55 nm to 200 nm.

11. The carbon black product of claim 10, wherein the conjugated diamine groups comprise a carboxylic or sulfonic acid substituted group.

12. An inkjet ink composition comprising water and dispersed carbon black pigment particles comprising surface modified carbon black obtained by the process of claim 1, comprising carbon black particles having conjugated diamine groups attached to the carbon black particle surfaces.

13. The inkjet ink composition of claim 12, wherein the conjugated diamine groups comprise a carboxylic or sulfonic acid substituted group and the carbon black pigment particles are self-dispersing.

14. The inkjet ink composition of claim 13, wherein the carbon black pigment particles have a volume weighted median equivalent spherical particle diameter of from 55 nm to 200 nm.

15. The inkjet ink composition of claim 13, wherein the self-dispersing pigment particles are present at a weight concentration of from 1 to 10 wt %.

* * * * *